US009446459B2

(12) United States Patent
De Mattia

(10) Patent No.: US 9,446,459 B2
(45) Date of Patent: Sep. 20, 2016

(54) SURFACE MACHINING DEVICE FOR A CELLULAR STRUCTURE

(71) Applicant: Airbus Operations S.A.S., Toulouse (FR)

(72) Inventor: Denis De Mattia, Basse Goulaine (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 14/691,661

(22) Filed: Apr. 21, 2015

(65) Prior Publication Data

US 2015/0306683 A1 Oct. 29, 2015

(30) Foreign Application Priority Data

Apr. 28, 2014 (FR) ..................................... 14 53803

(51) Int. Cl.
*B23C 3/30* (2006.01)
*B23Q 1/42* (2006.01)
*B23C 5/16* (2006.01)

(52) U.S. Cl.
CPC . *B23C 3/30* (2013.01); *B23C 5/16* (2013.01); *B23C 2215/04* (2013.01); *B23C 2220/36* (2013.01); *B23C 2220/40* (2013.01); *B23C 2228/25* (2013.01); *B23C 2260/04* (2013.01); *B23Q 1/42* (2013.01); *Y10T 409/30784* (2015.01); *Y10T 409/306496* (2015.01); *Y10T 409/308624* (2015.01)

(58) Field of Classification Search
CPC ................ B23C 2228/25; Y10T 409/306496; Y10T 409/30672
USPC ................................................ 409/180, 184
See application file for complete search history.

(56) References Cited

U.S. PATENT DOCUMENTS

| 2,701,986 A | * | 2/1955 | Petty | ........................ | E04F 21/28 409/180 |
| 3,264,128 A | * | 8/1966 | Argueso, Jr. | ........... | B23Q 3/086 106/287.17 |
| 3,709,094 A | * | 1/1973 | Laux | ........................ | B26D 1/44 144/119.1 |
| 4,677,886 A | * | 7/1987 | Neu | ........................ | B23C 5/165 144/218 |
| 4,907,920 A | * | 3/1990 | Lund | ........................ | B23C 5/00 407/2 |
| 6,435,784 B2 | | 8/2002 | De Mattia et al. | | |
| 7,186,170 B2 | | 3/2007 | Harwath-Seyfried | | |

(Continued)

FOREIGN PATENT DOCUMENTS

DE            18 86 766 U      1/1964
DE      10 2004 027032 A1     12/2005

(Continued)

OTHER PUBLICATIONS

Search Report FR 14 53803 dated Dec. 18, 2014.

*Primary Examiner* — Erica E Cadugan
(74) *Attorney, Agent, or Firm* — Lerner, David, Littenberg, Krumholz & Mentlik, LLP

(57) ABSTRACT

A device for machining a slot on a surface of a cellular structure includes a machining head that includes a chassis, a rotary tool rotating about a tool axis perpendicular to the direction of the slot, two guide wheels arranged on either side of the rotary tool that have a plurality of teeth configured and positioned such that they penetrate the cells of an alignment of the cellular structure. The machining head includes a link between the chassis and at least one guide wheel that enables a degree of freedom in a lateral direction parallel to the tool axis such that the guide wheel is movable in relation to the rotary tool in the lateral direction.

11 Claims, 3 Drawing Sheets

(56) References Cited

U.S. PATENT DOCUMENTS

2003/0039517 A1    2/2003   Golding  
2012/0142257 A1    6/2012   Blower

FOREIGN PATENT DOCUMENTS

EP      1 112 796 A1    7/2001  
GB      1293489 A   *   10/1972

* cited by examiner

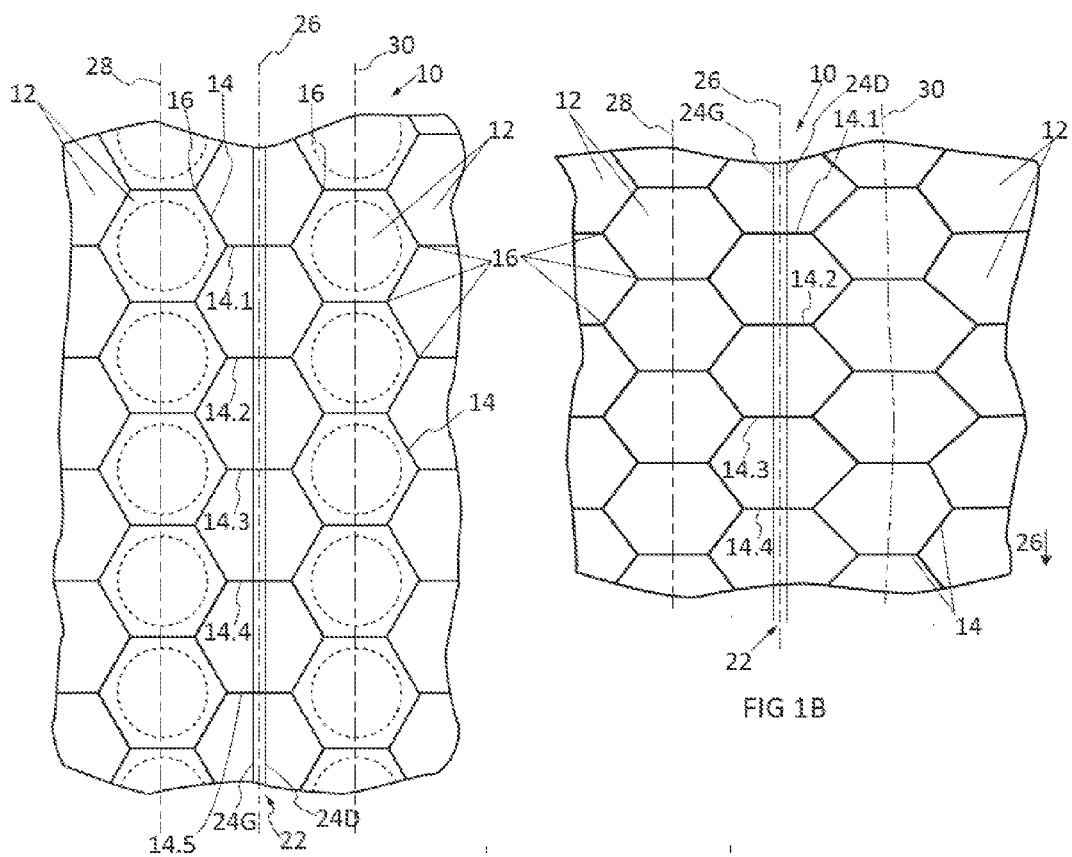
FIG 1A
FIG 1B
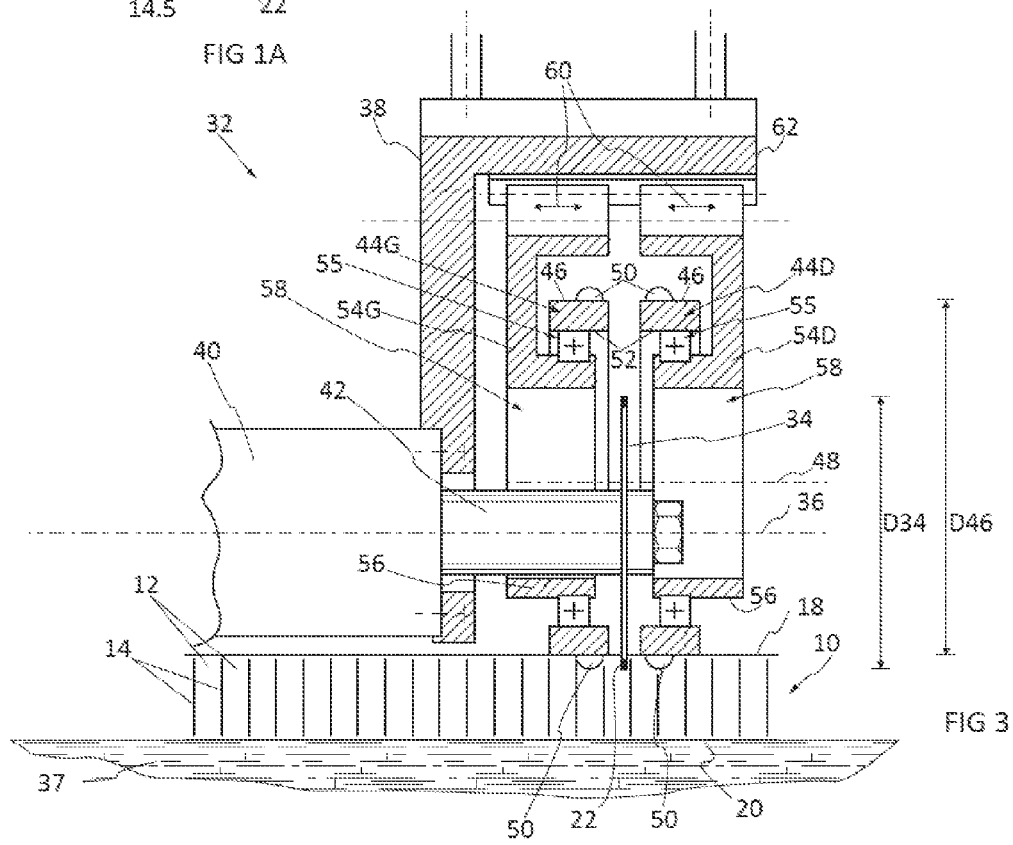
FIG 3

SURFACE MACHINING DEVICE FOR A CELLULAR STRUCTURE

FIELD OF THE INVENTION

The present invention relates to a surface machining device for a cellular structure.

BACKGROUND OF THE INVENTION

A cellular structure comprises tubular cells juxtaposed with regular sections, arranged along juxtaposed alignments. According to one embodiment, the cellular structure is referred to as a honeycomb structure and each cell has a hexagonal cross section. Regardless of the pattern, the cellular structure includes partitions that separate the cells and a plurality of nodes, each of which corresponds to the shared edge between several partitions. In a honeycomb cellular structure, the nodes are found at the vertexes of the hexagonal shapes and each node corresponds to the shared edge of three partitions.

Each tubular cell has two extremities that correspond to the free borders of the partitions. The first extremities of the tubular cells form a first surface of the cellular structure and the second extremities form a second surface of the cellular structure.

For certain applications, it is necessary to form a slot in at least one surface of the cellular structure to communicate certain cells with each other, in particular to obtain a drainage function in cellular structures used for acoustic treatment and arranged in an air inlet of an airplane nacelle. Thus, each partition intersecting with the slot includes a cutout that must be positioned preferably equidistant from the nodes linked by said partition.

A device for machining a slot in a surface of a cellular structure is described in document EP 1112796. Such a device includes a machining head that holds a circular saw mounted on an output shaft of a motor and two guide wheels arranged on either side of the circular saw that can pivot freely in relation to the output shaft of the motor. The guide wheels and the saw are attached along the axis of the output shaft of the motor.

The guide wheels and the circular saw are coaxial and the radius of the circular saw is greater than the radius of the guide wheels, the difference in radius being approximately equal to the depth of the slot.

To provide guidance, each guide wheel includes a series of teeth distributed evenly about the circumference of the guide wheel, said teeth being arranged in a plane perpendicular to the output shaft of the motor. The shape of each tooth fits a tubular cell. Moreover, the diameter of the guide wheel and the pitch of the teeth are determined such that the guide wheels roll without slipping on the surface of the cellular structure, the teeth penetrating the tubular cells successively. The circular saw is in an intermediate position between two series of teeth.

To form the slot, the machining head is moved above the surface of the cellular structure in a direction corresponding to the direction of the slot to be formed, the output shaft of the motor being perpendicular to said direction. When the guide wheels are rolling on the surface of the cellular structure, the teeth penetrate the cells and the guide wheels are positioned in relation to said cells by the teeth. As the circular saw cannot be moved along the axis of the output shaft of the motor in relation to the guide wheels, it is automatically correctly positioned in relation to the tubular cells.

In practice, the machining device described in document EP 1112796 makes it possible to correctly position the notch in each partition crossed by the slot if the tubular cells of the cellular structure are correctly aligned.

However, the production of cellular structures can generate alignment errors in the cells, caused for example by non-uniform expansion of the structure.

If the alignment errors are too great, the teeth of a first guide wheel cannot be inserted correctly into the cells simultaneously with the teeth of the second guide wheel, without causing a local deformation of the cellular structure. In this case, the circular saw cannot be correctly positioned equidistant at all points from the line of the cells located to the right of same (followed by the teeth of the first guide wheel on the right-hand side) and from the line of cells located to the left of same (followed by the teeth of the second guide wheel on the left-hand side). Consequently, the slot may be offset laterally and interfere with the nodes. This lateral offsetting is also accentuated by heeling of the circular saw, which also tends to increase the width of the slot.

If the slot interferes with the node, the compression strength of the cellular structure is significantly affected around this node.

To overcome this problem, the tolerances related to the alignment criteria of the cells of the cellular structure are made more stringent so that the cells arranged on either side of the slot to be formed are correctly aligned.

However, these more stringent tolerances increase the cost of the cellular structure.

Moreover, the present invention is intended to improve the device described in document EP 1112796 to enable same to machine a slot in a cellular structure with tolerances relating to the alignment criteria of the cells that are less stringent than those required by the device in the prior art, the slot formed not affecting the nodes of said structure.

BRIEF SUMMARY OF THE INVENTION

For this purpose, the invention relates to a device for machining a slot on a surface of a cellular structure, said device including a machining head that includes a rotary tool rotating about a tool axis, two guide wheels arranged on either side of the rotary tool, each guide wheel having a plurality of teeth configured and positioned such that they penetrate the cells of an alignment of the cellular structure when said guide wheel is rolled over the surface of the cellular structure, wherein the machining head includes a link between the chassis and at least one guide wheel that enables a degree of freedom in a lateral direction parallel to the tool axis such that said guide wheel is movable in relation to the rotary tool in the lateral direction.

According to this configuration, the gap between the guide wheels can be varied and adapted automatically to any alignment errors in the cells.

Advantageously, the machining head includes a link between the chassis and each guide wheel that enables a degree of freedom in the lateral direction such that the two guide wheels are movable in relation to the rotary tool in the lateral direction.

Preferably, the machining head includes, for each guide wheel, a wheel support, a pivoting link positioned between the guide wheel and the corresponding wheel support.

According to one feature, the machining head includes at least one guide rail that extends in the lateral direction and that is fixed in relation to the chassis, the wheel supports being movable along said guide rail. According to one embodiment, the guide rail has an inverted "T" section and each wheel support has a slot with a "T" section that is identical, notwithstanding sliding clearance, to the "T" section of the guide rail.

According to a feature of the invention, the machining head includes a mechanism for synchronizing the movements of the guide wheels to make them symmetrical in relation to the rotary tool.

Preferably, the synchronization mechanism includes a pinion and each guide wheel is mounted pivotingly on a wheel support that includes a rack that meshes with the pinion and that extends in a direction parallel to the lateral direction, the racks being parallel and arranged facing one another on either side of the pinion.

According to a feature of the invention, the tool axis and the wheel axes are offset, the tool axis being closer to the surface of the cellular structure than the wheel axes.

Preferably, the external diameter of the rotary tool is less than the external diameter of the guide wheels.

BRIEF DESCRIPTION OF THE DRAWINGS

Other features and advantages are set out in the description of the invention below, given purely by way of example and with reference to the attached drawings, in which:

FIG. 1A is a top view of a cellular structure with no alignment errors including a slot formed with a machining device fitted with a machining head according to an embodiment of the invention, FIG. 1B is a top view of a cellular structure with one alignment error including a slot formed with a machining device fitted with a machining head according to an embodiment of the invention, FIG. 3 is a longitudinal cross section of the machining head shown in FIG. 2.

DETAILED DESCRIPTION

Figure 2:
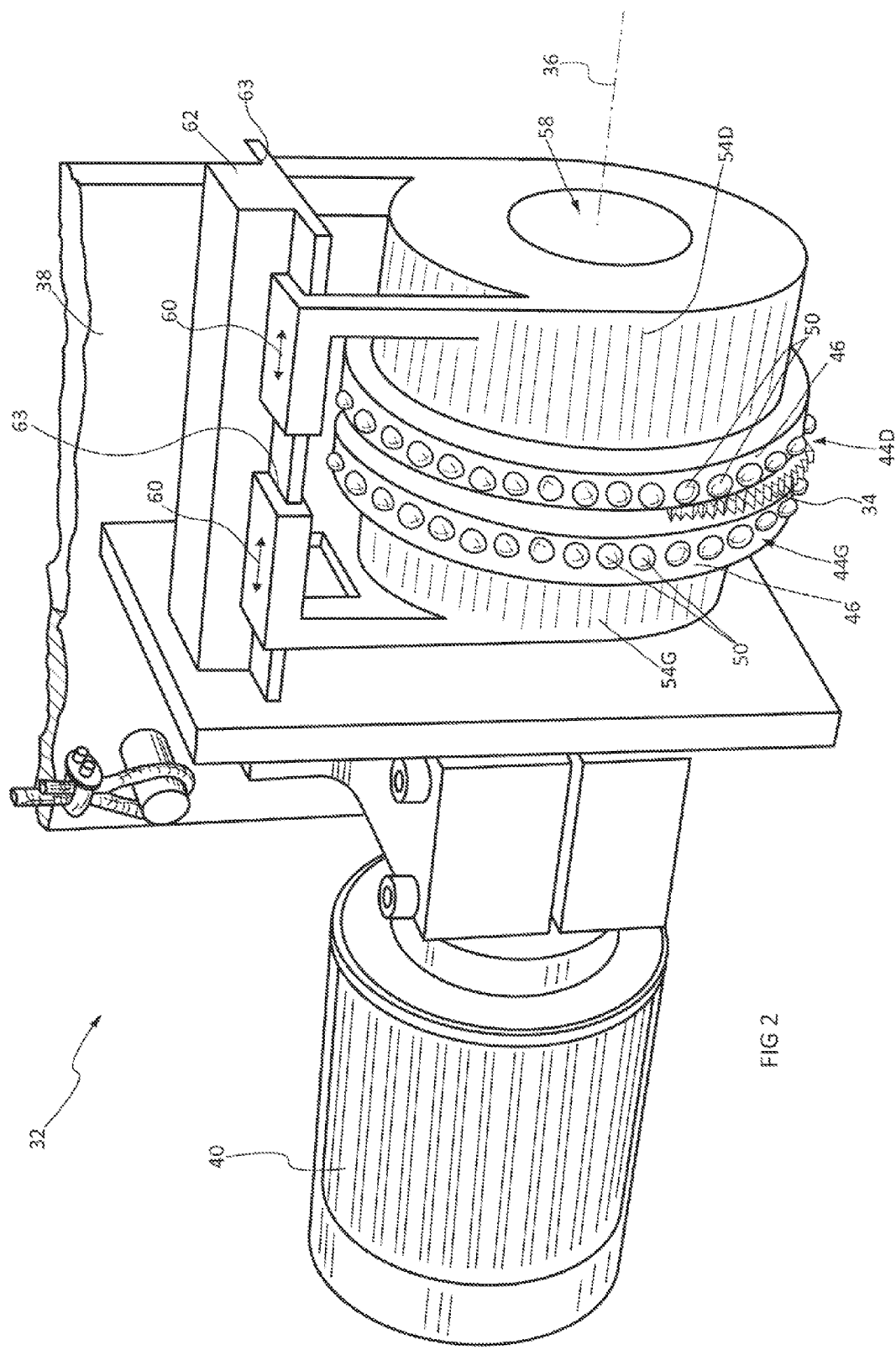
FIG. 2 is a perspective view of a machining head illustrating an embodiment of the invention.

FIGS. 1A and 1B show a cellular structure 10 including a plurality of tubular cells 12 separated by partitions 14 that have shared edges referred to as nodes 16. Each cell 12 has openings at a first extremity and at a second extremity. The first extremities of the cells form a first surface 18 of the cellular structure and the second extremities of the cells form a second surface 20 (shown in FIGS. 3 and 5).

According to one embodiment shown in FIGS. 1A and 1B, the cellular structure is a honeycomb structure and the cells 12 have a hexagonal section. Neither the cellular structure nor the manufacturing method of same are described since they are known to the person skilled in the art.

A slot 22 is formed on one of the surfaces, for example the surface 18. This slot 22 intersects with a series of parallel partitions 14.1, 14.2, 14.n and forms, at each intersecting partition, a square or rectangular cutout with two borders, a left-hand border 24G and a right-hand border 24D. The invention is not limited to this square or rectangular section for the slot 22. Shapes of greater complexity are possible. For each intersecting partition, the slot 22 must be arranged equidistant from the nodes linked by said partition.

As shown in FIGS. 1A and 1B, the slot 22 extends in a direction 26 (shown by an axis line) that corresponds to a first cell alignment.

The cellular structure includes, on either side of the first cell alignment, a left-hand cell alignment 28 and a right-hand cell alignment 30.

If there are no alignment errors, the cell alignments are regularly spaced, as shown in FIG. 1A.

FIG. 1B shows an alignment error. In this case, the cell alignments 26, 28, 30 are not regularly spaced.

To ensure that the slot 22 does not interfere with the nodes 16 and is approximately centered between the nodes of the intersecting partitions 14.1 to 14.n, the slot 22 must be positioned equidistant from the left-hand alignment 28 and the right-hand alignment 30, as shown in FIGS. 1A and 1B, even if there is an alignment error.

A machining device is used to form the slot 22.

This machining device comprises a frame, a tool holder that is movable in relation to the frame, a machining head 32 that is movable in relation to the tool holder, a first kinematic linkage to control the movements of the tool holder and a second kinematic linkage between the tool holder and the machining head.

The machining head 32 includes a rotary tool 34 that rotates about a tool axis 36 oriented perpendicular to the direction 26 of the slot 22.

The first kinematic linkage in particular enables the tool holder to be moved in the direction 26 of the slot 22.

The second kinematic linkage enables at least a degree of freedom between the machining head and the tool holder, in particular a first translational movement parallel to the tool axis 36 (perpendicular to the direction 26 of the slot). Preferably, the second kinematic linkage enables several degrees of freedom, a first translational movement parallel to the tool axis 36 (perpendicular to the direction 26 of the slot), a second translational movement perpendicular to the surface 18 of the cellular structure, a first rotation about a first axis of rotation perpendicular to the surface 18 of the cellular structure and a second rotation about a second axis of rotation parallel to the direction 26 of the slot 22. Thus, these degrees of freedom enable the machining head 32 to be positioned correctly in relation to the surface 18 of the cellular structure, even if the surface is not perfectly flat.

The machining device also includes a machining table 37 (visible in FIG. 3) on which the cellular structure 10 to be machined is clamped.

The machining table, the frame, the tool holder, and the first and second kinematic linkages are also not described because they can be identical to those described in document EP 1112796.

As shown in FIGS. 2 and 3, the machining head 32 includes a chassis 38 linked by the second kinematic linkage to the tool holder, a motor 40 rigidly connected to the chassis 38 with an output shaft 42, the axis of which is the tool axis 36, and a rotary tool 34 rigidly connected by a detachable link to the output shaft 42. In general, the rotary tool 34 is linked to the chassis 38 by a link that enables the rotation of said rotary tool 34 about the tool axis 36 but that immobilizes the rotary tool 34 in relation to the chassis 38 in a direction parallel to the tool axis 36.

The rotary tool 34 is a grinding wheel, a circular saw or other. The shape of the rotary tool 34 is adapted to suit the section of the slot 22.

The machining head 32 also includes two guide wheels, a first guide wheel 44G arranged to the left of the rotary tool 34 and a second guide wheel 44D arranged to the right of the rotary tool 34.

Each guide wheel 44G or 44D includes an axis of rotation referred to as the wheel axis 48, an external cylindrical surface 46 and a plurality of teeth 50 distributed regularly around the circumference of the external surface 46, in a plane perpendicular to the wheel axis 48. The wheel axes 48 and the tool axis 36 are parallel and perpendicular to the direction 26 of the slot 22 to be formed.

The dimensions and shapes of the teeth, and the pitch of same are determined as a function of the shapes and dimensions of the cells 12 of the cellular structure such that when each of the guide wheels is rolling over the surface of the cellular structure 10 along a cell alignment, the teeth successively penetrate the cells in said alignment.

According to one embodiment, each guide wheel 44D or 44G is a ring delimited externally by the external surface 46 and internally by an internal cylindrical surface 52, the external surface 46 and the internal surface 52 being coaxial.

Preferably, the guide wheels 44D and 44G are identical and coaxial.

The first guide wheel 44G is mounted on a first wheel support 54G and the second guide wheel 44D is mounted on a second wheel support 54D.

For each guide wheel, a pivoting link 55 is positioned between the guide wheel and the wheel support of same such as to enable a rotational movement of each guide wheel in relation to the wheel axis 48. For each guide wheel, the pivoting link 55 prevents the guide wheel from moving in translation in relation to the wheel support of same in the direction of the wheel axis 48.

According to one embodiment, each wheel support 54D or 54G includes a cylindrical bearing 56 on which the corresponding guide wheel is mounted pivotingly. The pivoting link 55 includes one bearing means such as a bearing, for example a needle bearing, positioned between each cylindrical bearing 56 and the internal surface 52 of the corresponding guide wheel to facilitate the frictionless rotation of the guide wheels on the cylindrical bearings 56.

At least one wheel support positioned between the motor 40 and the rotary tool 34 includes a through hole 58 for the output shaft 42 of the motor 40. Preferably, each wheel support 54D or 54G includes a through hole 58.

According to a feature of the invention, the tool axis 36 and the wheel axes 48 are offset, the tool axis 36 being closer to the surface 18 of the cellular structure 10 than the wheel axes 48.

According to the invention, on account of the offset between the axes 36 and 48, the external diameter D34 of the rotary tool 34 is less than the external diameter D46 of the guide wheels 44D, 44G. This makes it possible to set an external diameter D34 for the rotary tool that is less than 0.75 times the external diameter D46 of the guide wheels 44D, 44G.

Figure 5:
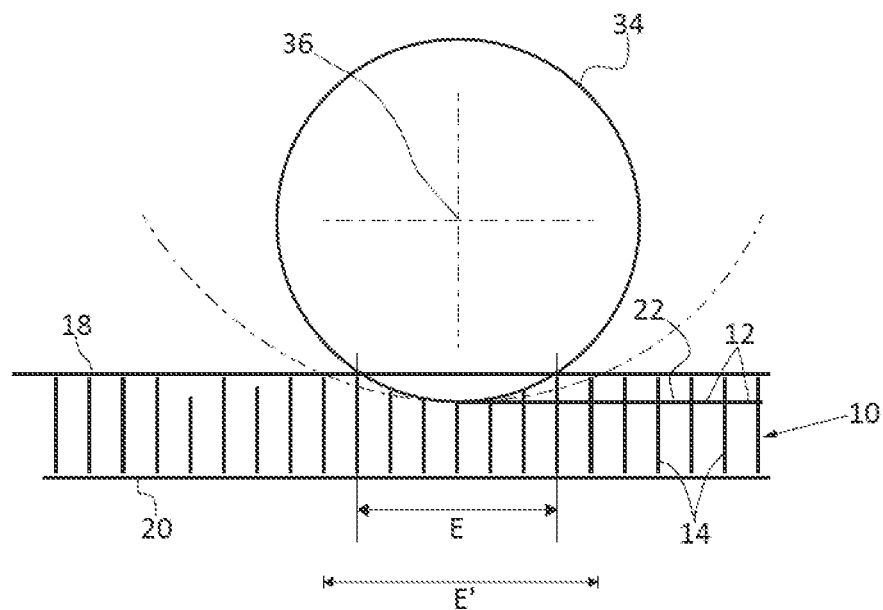
FIG. 5 is a side view of the rotary tool of the machining head in FIG. 2 engaged with a cellular structure.

As shown in FIG. 5, the engagement E of the rotary tool 34 according to the invention, shown using a bold line, with the cellular structure 10 is significantly less than the engagement E' of a rotary tool in the prior art, shown using a dotted line, the external diameter of which is greater than the external diameter of the guide wheels.

This layout helps to reduce heeling at the front and at the back of the tool, which tends to increase the dimensions of the cutouts and to shift the tool laterally (perpendicular to the direction 26 of the slot).

The diameter of the through holes 58 is large enough to seat the output shaft 42, which is offset in relation to the wheel axes 48.

According to one feature of the invention, at least one guide wheel 44D or 44G is movable in relation to the rotary tool 34 and can move in a lateral direction 60 parallel to the tool axis 36 (i.e. perpendicular to the direction 26 of the slot). Thus, the machining head includes a link between the chassis 38 and the machining head and at least one movable guide wheel that enables a degree of freedom in a lateral direction 60.

According to this configuration, the gap between the guide wheels 44D and 44G can be varied and adapted automatically to any alignment faults in the cells.

Preferably, the two guide wheels 44D and 44G are movable in the lateral direction 60. Thus, the machining head includes a link between the chassis 38 of the machining head and each movable guide wheel that enables a degree of freedom in a lateral direction 60.

Advantageously, the machining head 32 includes at least one guide rail 62 that extends in the lateral direction and that is fixed in relation to the chassis 38 and the wheel supports 54G and 54D are movable along said guide rail 62. For this purpose, the shapes of the guide rail 62 complement the shapes of the wheel supports 54D and 54G.

According to one embodiment, the guide rail 62 has an inverted "T" section and each wheel support has a slot 63 with a "T" section that is identical, notwithstanding sliding clearance, to the "T" section of the rail. Thus, each wheel support 54D and 54G is suspended from the guide rail 62.

The guide rail 62 and/or the wheel supports 54D, 54G have a coating that facilitates the frictionless sliding of the wheel supports along the guide rail 62.

Figure 4:
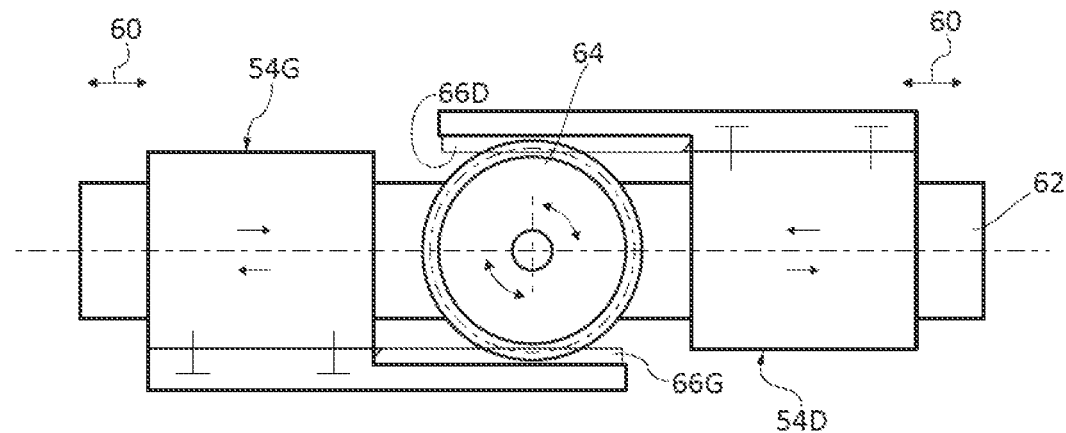
FIG. 4 is a diagram showing the operating mechanism of the wheel supports of the machining head, showing a variant of the invention.

Advantageously, as shown in FIG. 4, the machining head 32 includes a mechanism for synchronizing the movements of the guide wheels 44D and 44G to ensure they are symmetrical in relation to the rotary tool 34. Consequently, the guide wheels 44D and 44G move in the same lateral direction 60, but in opposite ways.

The synchronization mechanism enables the guide wheels to be positioned equidistant from the rotary tool 34 at all times. Thus, when the gap between the guide wheels 44D and 44G varies, the rotary tool 34 is always in an intermediate position.

According to an embodiment shown in FIG. 4, the synchronization mechanism includes a pinion 64 with an axis of rotation perpendicular to the tool axis 36 and to the direction 26 of the slot and each wheel support 54D and 54G includes a rack 66D and 66G that meshes with the pinion 64 and that extends in a direction parallel to the lateral direction (which is itself parallel to the tool axis 36), the racks 66D and 66G being parallel and arranged facing one another on either side of the pinion 64. Thus, when the wheel support 54G moves away from the rotary tool 34, the rack 66G causes the pinion 64 to rotate clockwise. Simultaneously, the rotation of the pinion 64 causes the translational movement of the rack 66D and of the wheel support 54D, which also moves away from the rotary tool 34.

Conversely, when the wheel support 54G moves towards the rotary tool 34, the rack 66G causes the pinion 64 to rotate counterclockwise. Simultaneously, the rotation of the pinion 64 causes the translational movement of the rack 66D and of the wheel support 54D, which also moves towards the rotary tool 34. The operating principle of the machining device is described below.

As shown in FIG. 1B, to form the slot 22, the first guide wheel 44G has to follow the left-hand alignment 28, which is rectilinear, and the second guide wheel 44D has to follow the right-hand alignment 30, which is not rectilinear on account of an alignment error.

When the guide wheels roll over the surface 18 of the cellular structure, the teeth of the first guide wheel 44G successively penetrate the cells of the left-hand alignment 28 and the teeth of the second guide wheel 44D successively penetrate the cells of the right-hand alignment 30.

As shown in FIG. 1B, the gap between the left-hand and right-hand alignments increases as the machining head moves in the direction 26.

The teeth 50 of the second guide wheel 44D follow the curved shape of the right-hand alignment 30 and cause the second wheel 44D to move away from the rotary tool 34. This movement is possible because the wheel support 54D is movable in translation in the lateral direction 60. The synchronization mechanism and the fact that the wheel support 54G is also movable in translation in the lateral direction 60 cause the wheel support 54G and the guide wheel 44G to move away from the rotary tool 34 as well. The synchronization mechanism ensures that the rotary tool 34 is always in an intermediate position, regardless of the gap between the two guide wheels 44D and 44G.

If the left-hand alignment 18 is rectilinear, the movement of the guide wheel 44G is compensated by a small movement in the lateral direction 60 of the machining head in relation to the tool holder, which is made possible by the degree of freedom provided in the second kinematic linkage.

The invention provides the following advantages:

The guide wheels are no longer stressed when meshing with a cellular structure with an alignment error, the gap between the guide wheels being freely adjustable to the layout of the cellular structure.

The rotary tool is self-positioning in a plane symmetrical to the guide wheels, such that it is in all cases correctly positioned in relation to the partition to be cut and does not damage the nodes of the cellular structure.

The reduced engagement of the rotary tool in the cellular structure minimizes heeling and limits the risk of the slot being widened.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for machining a slot in a surface of a cellular structure that includes a plurality of cells arranged along alignments, the slot being oriented in a direction corresponding to a first cell alignment, said device comprising:
   a machining head including a chassis;
   a rotary tool rotating about a tool axis perpendicular to the direction of the slot;
   a first guide wheel arranged to one side of the rotary tool;
   a second guide wheel arranged to another side of the rotary tool opposite the first side, each of the guide wheels having a respective wheel axis parallel to the tool axis, and each of the guide wheels having a respective external surface with a respective plurality of teeth configured and positioned such as to penetrate the cells in a respective one of the alignments of the cellular structure when each said guide wheel rolls over the surface of the cellular structure,
   wherein the machining head includes a link between the chassis and at least one of the guide wheels enabling a degree of freedom in a lateral direction parallel to the tool axis such that said at least one of the guide wheels is movable in relation to the rotary tool in the lateral direction.

2. The machining device as claimed in claim 1, wherein the inclusion of a link between the chassis and at least one of the guide wheels is an inclusion of a link between the chassis and each of the guide wheels enabling a degree of freedom in the lateral direction such that the two guide wheels are movable in relation to the rotary tool in the lateral direction.

3. The machining device as claimed in claim 2, wherein the link between the chassis and each of the first and second guide wheels comprises a guide rail.

4. The machining device as claimed in claim 1, wherein the machining head includes, for each of the guide wheels, a respective wheel support, and a respective pivoting link positioned between the respective guide wheel and the corresponding wheel support.

5. The machining device as claimed in claim 4, wherein the link includes at least one guide rail extending in the lateral direction and fixed in relation to the chassis, the wheel supports being movable along said at least one guide rail.

6. The machining device as claimed in claim 5, wherein the at least one guide rail has an inverted "T" section, and each of the wheel supports has a respective slot with a "T" section that is identical, notwithstanding sliding clearance, to the "T" section of the at least one guide rail.

7. The machining device as claimed in claim 1, wherein the machining head includes a mechanism for synchronizing the lateral movements of the guide wheels to ensure the guide wheels are symmetrically located in relation to the rotary tool.

8. The machining device as claimed in claim 7, wherein the synchronization mechanism includes a pinion and wherein each of the guide wheels is mounted pivotingly on a respective wheel support including a respective rack meshing with the pinion and extending in a direction parallel to the lateral direction, the racks being parallel and arranged facing one another on two opposite side of the pinion.

9. The machining device as claimed in claim 1, wherein the tool axis and the wheel axes are offset, the tool axis being closer to the surface of the cellular structure than the wheel axes are.

10. The machining device as claimed in claim 9, wherein an external diameter of the rotary tool is less than an external diameter of each of the guide wheels.

11. The machining device as claimed in claim 9, further comprising a respective wheel support for each of the guide wheels, wherein one of the wheel supports is positioned between the rotary tool and a motor provided to drive the rotary tool in rotation, and wherein at least the one wheel support that is positioned between the rotary tool and the motor includes a through hole.

* * * * *